United States Patent
Ramirez et al.

[11] Patent Number: 5,907,605
[45] Date of Patent: May 25, 1999

[54] DUAL FORMAT CALLER ID FOR BOTH FSK AND DTMF CALLER ID FORMATS

[75] Inventors: Ismael Ortiz Ramirez; Jaime Antonio Uribe Uribe; Mariano Centeno Camarena, all of Queretaro, Mexico

[73] Assignee: Servicios Condumex S.A. de C.V., Queretero, Mexico

[21] Appl. No.: 08/844,371

[22] Filed: Apr. 18, 1997

[30] Foreign Application Priority Data

Jul. 3, 1996 [MX] Mexico ................................. 962601

[51] Int. Cl.[6] .................................................. H04M 3/42
[52] U.S. Cl. ........................................... 379/142; 379/376
[58] Field of Search .................................... 379/142, 215, 379/372, 373, 376, 157, 130

[56] References Cited

U.S. PATENT DOCUMENTS

| | | | |
|---|---|---|---|
| 5,263,084 | 11/1993 | Chaput | 379/157 |
| 5,265,145 | 11/1993 | Lim | 379/199 |
| 5,274,699 | 12/1993 | Ranz | 379/142 |
| 5,289,542 | 2/1994 | Kessler | 380/4 |
| 5,315,650 | 5/1994 | Smith | 379/399 |
| 5,341,411 | 8/1994 | Hashimoto | 379/67 |
| 5,351,289 | 9/1994 | Logsdon | 379/142 |
| 5,377,260 | 12/1994 | Long | 379/95 |
| 5,467,385 | 11/1995 | Reuben | 379/88 |
| 5,526,406 | 6/1996 | Luneau | 379/142 |
| 5,699,417 | 12/1997 | Khojasteh | 379/142 |
| 5,699,418 | 12/1997 | Jones | 379/142 |

*Primary Examiner*—Paul Loomis
*Attorney, Agent, or Firm*—Carmen Pili Curtis

[57] ABSTRACT

The dual equipment for identification of telephone calls is a terminal electronic device that meets the telephone specifications for the service of Caller Identification. It is an intelligent electronic equipment that is connected to the telephone line of a called user that, upon receiving a call phone, presents through a liquid crystal display the caller's telephone number information. The equipment can also store in the memory the telephone call identification when the subscriber is not in his place of business, and thus when the user returns he can check who called, or from which telephone number, as well as the date and time. It consists of a battery eliminator entry for its power supply and a support battery, it identifies the information sent to it by the network through the input signalization that can be of DMF (Dual Tone Multifrequency) type or FSK (Frequency Shift Keying) type.

21 Claims, 9 Drawing Sheets

FIG_4'

DUAL FORMAT CALLER ID FOR BOTH FSK AND DTMF CALLER ID FORMATS

BACKGROUND OF THE INVENTION

The dual equipment to identify telephone calls of the present invention is a terminal electronic device that meets the telephone company's specifications for the service of caller identification.

In the art, different device systems for the identification of telephone calls are known, such as the ones presented in U.S. Pat. No. 5,377,260 related to a telephone system that includes a modem connected to a processor and to a data access arrangement to detect the "caller-ID". With the "caller-ID" information detected, a specific action is taken. In U.S. Pat. No. 5,351,289, a device is described to automatically control the "ring" signal of an input signal generated by the telephone company to a communication equipment (telephone) through a switch electronic device series-connected to the telephone line. Based on the detected information of the "caller-ID", it is decided if the "ring" signal is passed or not to the telephone or to the communication equipment. U.S. Pat. No. 5,341,411 relates to system to block the caller information in such a way that it is not registered by the "Caller-ID". The caller that does not wish to send his identification data sends a previous code to the number to which he wishes to call, and with this code, the central inhibits the identification information. In this way, the "called person" does not receive identification information of the "caller" and, knowing that the "caller" did not wish to be identified, can accept or refuse the call. U.S. Pat. No. 5,315,650 describes a system in which, upon detecting the "ring" signal, the sending through the telephone of any information during a given time "T" is prevented in such a way that if the "Caller-ID" information appears on the line, said information can be more readily received. U.S. Pat. No. 5,289,542 relates to a telephone service for call identification that keeps the privacy of the originary station ("caller") and offers useful information to the "called person" through the encryption of the information. U.S. Pat. No. 5,274,699 relates to a type of information display source. Then it establishes communication with another equipment (receiver) and sends information about the selected information display source. In this way, the transmission unit can be more adequately identified. U.S. Pat. No. 5,265,145 relates to a telephone with a "caller-ID" capacity that has also the capacity to give the information shown on a display, spelled or spoken. It also has other functions such as: to take certain measures upon the identification of a certain "caller" or even to communicate through an infrared light link with other equipments to exchange information. In U.S. Pat. No. 5,263,084 a system is described in which a first caller involved with a second caller receives information from a third caller that wishes to talk to him. The first caller knowing who the third caller is, decides whether he accepts the call or not.

As can be seen, the abovementioned US patents only mentions the capacity to identify the "caller" but not as the main feature of the invention. Thus no patents have been found that claim the call identification function as a characteristic of the invention, which is one of the objects of the present invention.

In U.S. Pat. No. 5,467,385, a screen registration and call number system is described, in which call identification information is stored, said system includes a telephone call number when a personal call is not present and screen call identification information (CID) registrations, verbally to be repeated later. The system integrates the user's own telephone equipment with CID information, located on a telephone carrier by Central Office equipment. A terminal signal of personal call is used as trigger to disconnect an answering device of a telephone line and to place the decoded CID information which is processed by the logic control at the end of any message left by the caller.

Even though this invention includes a call identification registration, this equipment is related to an answering machine and a combination system which is not the object of the present invention.

DETAILED DESCRIPTION OF THE INVENTION

Hereinbelow, the invention shall be described according to the drawing of FIGS. 1.6 and 1a,b-5, in order to better define said invention but without limiting its scope, wherein:

FIG. 2a corresponds to an isometric top view of the first section of FIG. 1a.

FIG. 3a corresponds to an isometric low view of figure 1a.

FIG. 5a corresponds to a side view of the dual equipment backing of FIG. 1a.

Figure 1:
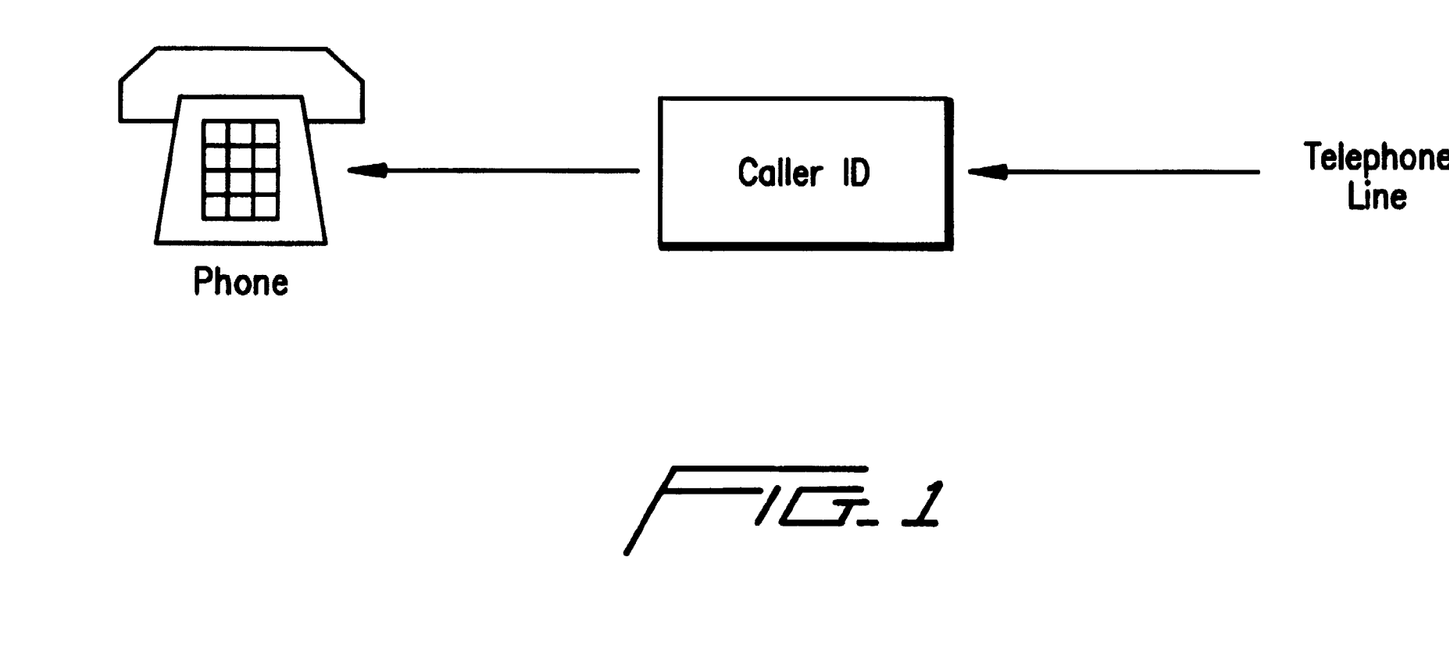
FIG. 1. is a basic connection system diagram of the dual equipment of call identification.
Figure 2:
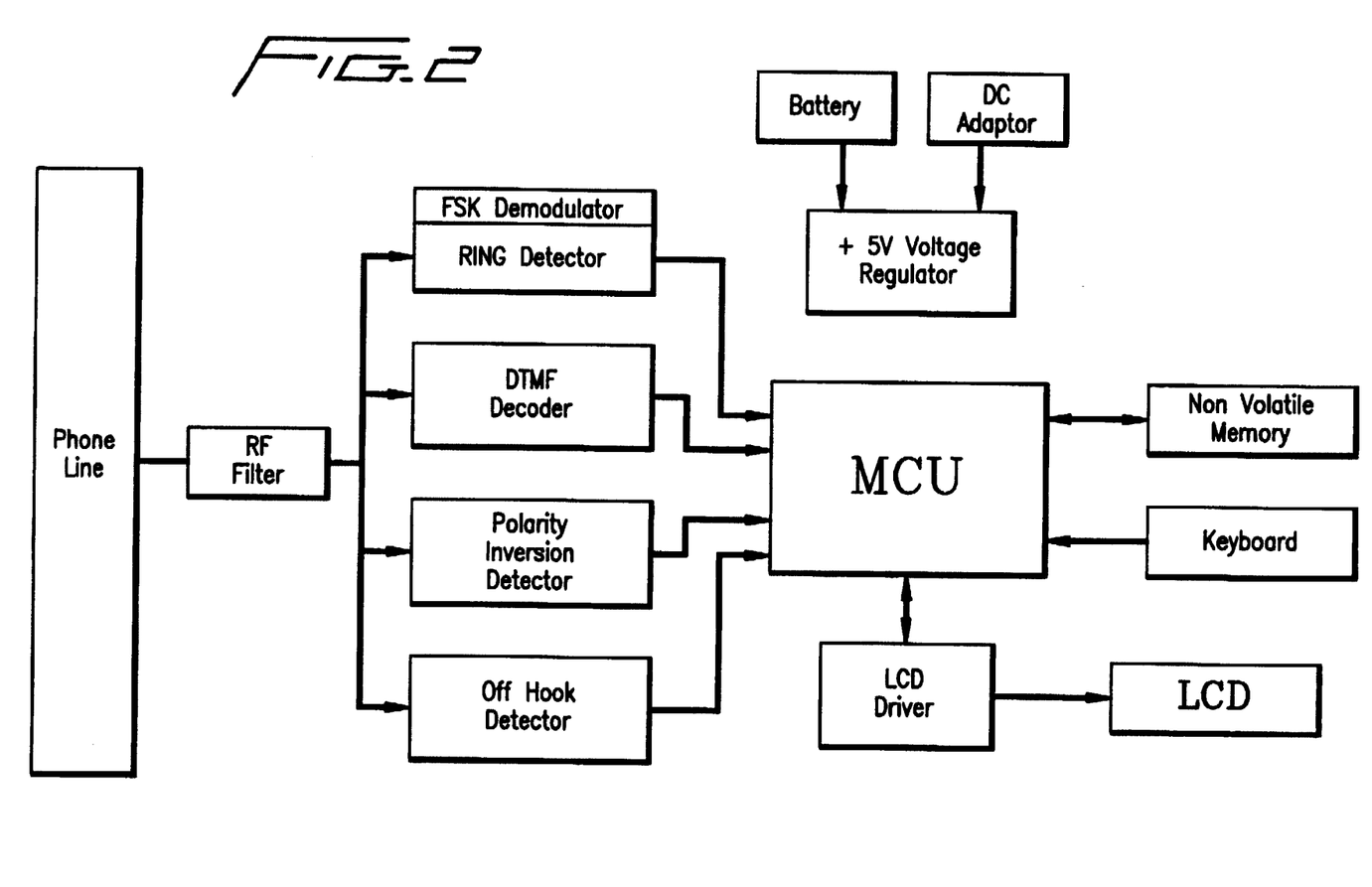
FIGS. 2 and 3 are block diagrams of the connection system of the call identificator device to the telephone lines.
Figure 2A:
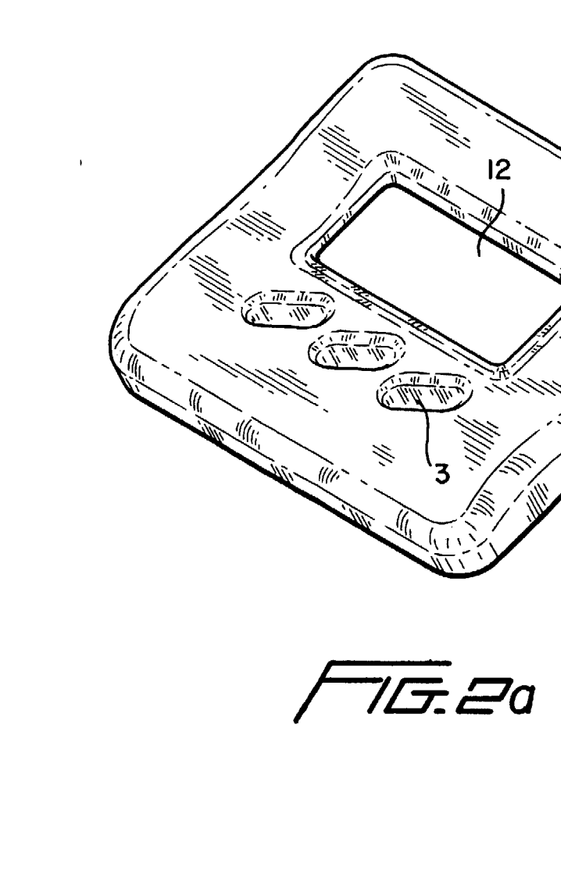
Figure 3:
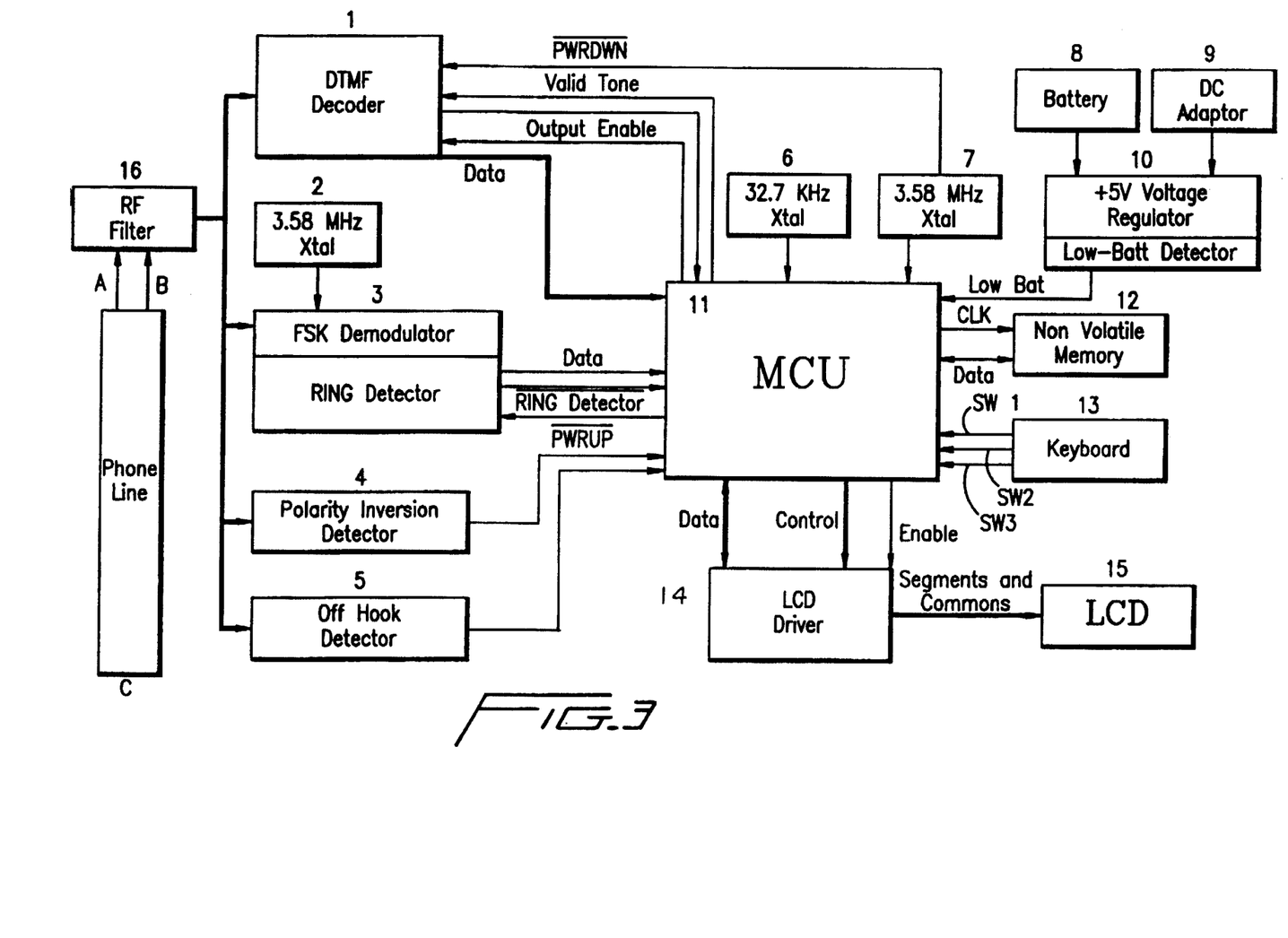
Figure 3A:
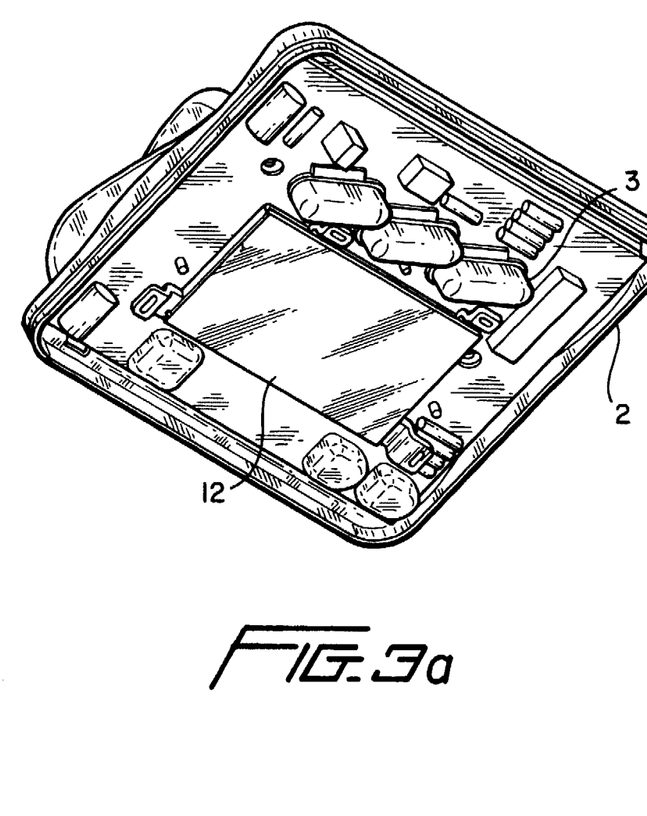

In FIG. 1, a basic connection diagram of the call identifier (B) the telephone (A) and the telephone line (C) is presented. In FIGS. 2 and 3, a diagram is presented in which the connection of the call identifier (B) to the telephone line and to its equipment internal components is presented.

Figure 4:
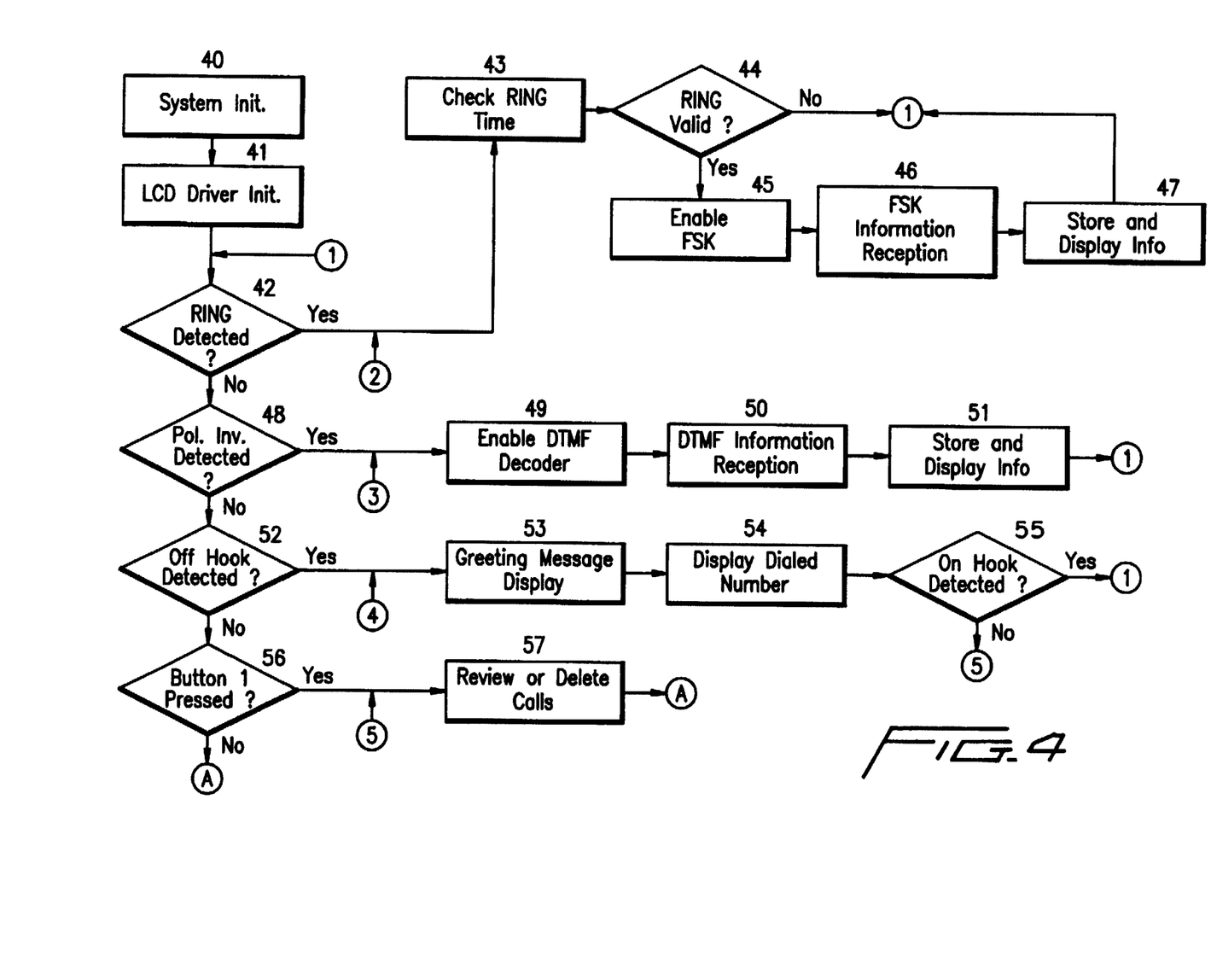
FIGS. 4 and $4^1$ are operative flow chart of the indicator.
Figure 4A:
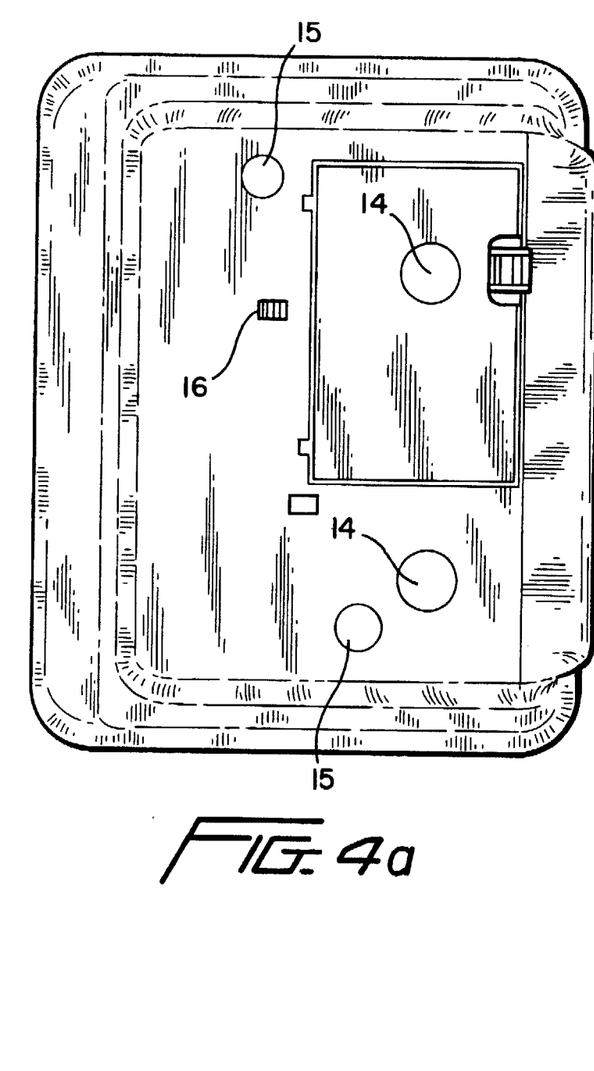
FIG. 4a corresponds to a low view of the third section.

The operation of the call identifier is explained through a flow chart. In FIG. 4 4' the relationship between each one of the parts of the equipment can be seen according to the received signal, in FSK form, FIG. 5, or in DTMF form, FIG. 6.

Figure 5:
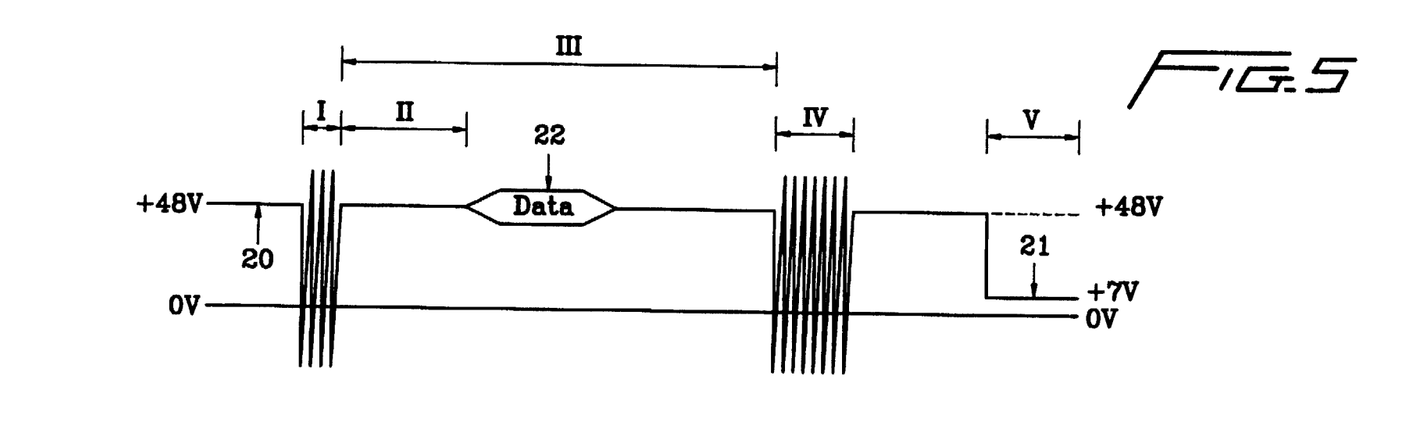
FIG. 5 is a FSK signalization form.
Figure 5A:
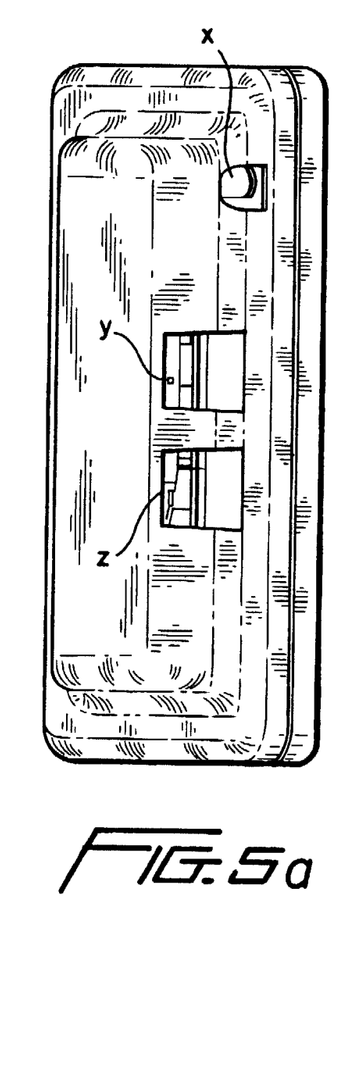
Figure 6:
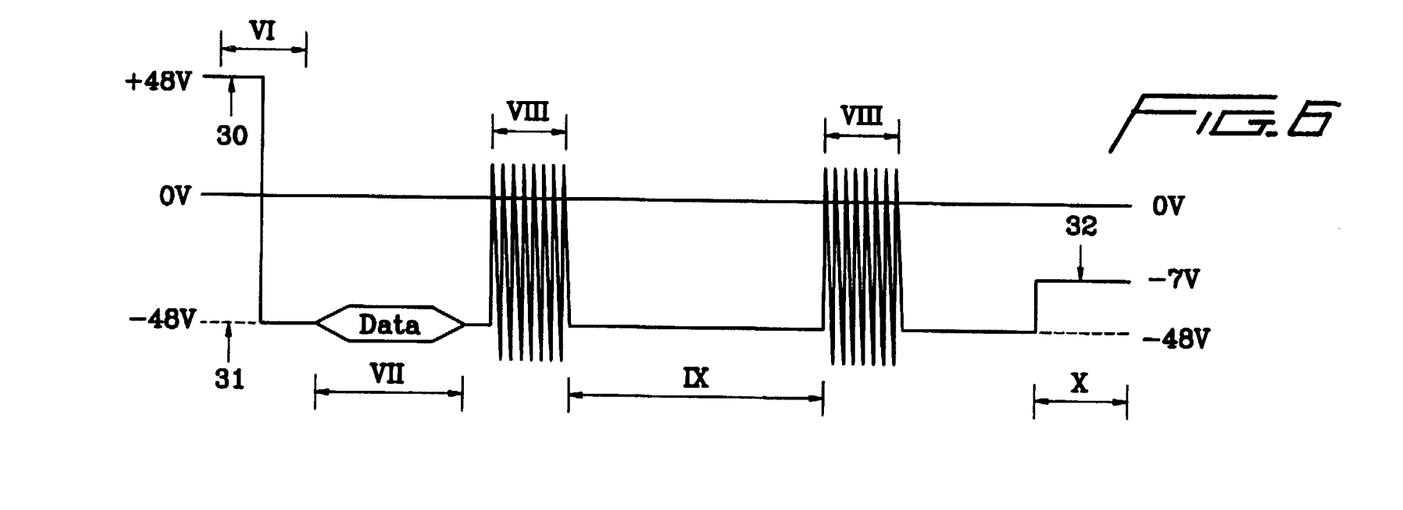
FIG. 6 is a DTMI signalization form.

In order to explain the details of the call identifier (B) operation, the signalization forms shown in FIGS. 5 and 6 shall be taken as bases.

In FIG. 5, the FSK signalization form used in Tel. Mex. telephone centrals can be seen, which includes the following:

a—A+48 VDC line voltage to a hung up microtelephone (20).

b—A 90–110 VAC call start current(I) with a duration of 200 to 400 ms (II).

c—From the call second current (IV) on, they will have a duration of 2 seconds (IV) and a voltage of 90–110 VAC.

d—The microtelephone lifted condition (21) with a line voltage between 6 and 7 VDC.

e—The information or data transmitted (22) is present during at least 500 ms (II) after the call start current.

f—The duration between call currents is 4 seconds. (III)

FIG. 6 presents the DTMF signalization form, which is also used in Telmex's telephone centrals and consists of the following items:

a—A+48 VDC line voltage (30) with hung up microtelephone.

b—A –48 VDC line voltage (31) which appears before sending the information or data (VII) and thus polarity change shall be obtained in the telephone line (C).

c—The call currents (VIII) with a 90–100 AC voltage and a duration of 2 seconds.

d—The transmitted data or information (VII) which is present after the polarity change (VI).

e—The lifted microtelephone condition (32) with a voltage between 6 and 7 VDC.

In the operation of the call identifier (B) any of the two abovementioned signalization forms can be present, according to the telephone central through which it is connected.

The call identifier (B) can detect both forms and enables automatically the reception of any of them according to the needs.

The object of the call identifier (B) is to detect the caller identification information in order to show it on the screen (15) FIG. 3 of the equipment. In order that the unit can operate, it must be able to detect the call start current (I), FIG. 5, polarity inversion (VI), the hanged up (20) and lifted (21) states of the microtelephone (A) to process the information and give the call identification service.

The basic functioning of the call identifier (B) can be described in a general way or with the help of the flow chart of FIG. 4, where the logic followed by the microcontroller (11) program used in the equipment is shown.

Upon turning on the call identifier (B), said identificator is initiated (40) first, FIG. 4, to be ready to receive information through the telephone line (C), in the same way as the screen handler initialization (41) which transfers the information from the microcontroller (11) to the LCD screen (15), in this moment the date, time and product information is presented. After this, the call identificator (B) is ready to receive the messages and to give information to the user.

In case of a call in FSK form, the call identifier (B) checks if a call start current (42) is present. If it is valid, it measures its duration and then check if it is within 200 and 400 ms range. If it is the case, it activates the FKS receiver (45) in order to receive the information through the telephone line (46). This information is decoded in order to be then stored and displayed on the screen (15). If the previous call start current was not valid, the call identifier returns to wait for a new call current; if it is not present, it checks if there is a polarity change (43) in the telephone line (C). If there has been a polarity change, the DTMF receiver (49) is activated to be ready to receive the information.

The DTMF information is received and decoded (50) to be stored and displayed on the call identifier (B) screen, then it wait again for a new call current, another polarity change, it checks if the microtelephone (A) was lifted, or if button 1 (56) is being pressed.

If it is detected that the microtelephone (A) is in the lifted state (52), the call identifier displays on the screen the courtesy message (53) and waits for the display (54) on the screen of the numbers being dialed on the microtelephone (A). Upon completing the dialed number, it checks if the microtelephone (A) is hung up (55). If it is the case, it checks a new call current (42), a polarity change (48), a microtelephone (52) lifted condition, but if the microtelephone (55) has not been hung up, it passes to consultation and/or erasure from the list of messages (57). If no button has been pushed and if a period of time of 30 seconds (58) has not passed, the call identifier (B) checks again the points (42), (48), (52), (55). If it is affirmative, it checks the list of messages. If none of the above options is present, within 30 seconds (58), FIG. $4^1$, the call identifier passes to an idle mode (59) displaying only on the screen the date, time and the number of new calls.

The call identifier (B) remains in idle state (59) till one of the following conditions are present: a call start current (60), a polarity inversion (62), the microtelephone (A) in a lifted state (64) or if the button 1, (66) is pressed. Upon ocurring one of the previous conditions, the call identifier (B) passes to the active mode and is again in operation.

DESCRIPTION OF THE BLOCKS AND SIGNALS FIG. 2.

1.—DTM receiver: circuit that decodes a DTM signal (Dual Tone Multifrequency) of the telephone line and converts it into a binary number.

2.—3.68 MHz oscillator: circuit that uses a ceramic resonator to produce a constant frequence signal that uses the FSAK demodulator.

3.—FSK demodulator/call current detector: circuit that demodulates the FSK (Frequency Shift Keying). It also detects the call start current (signal that activates the telephone bell) present in the telephone line.

4.—Polarity inversion detector: circuit that detects the polarity change in the A and B signals of the telephone line.

5.—hung up and lifted condition detector: circuit that detects when the microtelephone is lifted and when it is hung up again.

6.—32.768 KHz oscillator : circuit that uses a quartz crystal to produce a constant frequency signal. This signal is used as basis for real time clock.

7.—3.58 MHz oscillator: circuit that uses a ceramic resonator to produce a constant frequency signal. This oscillator provides the clock signal to the MCU and to the DTMF receiver.

8.—battery: this circuit allows the power supply of the unit from a 9 V DC battery.

9.—DC adapter This circuit allows the power supply of the unit from a 9 V DC battery eliminator connected to the commercial electric network.

10.—+5 V voltage regulator/low battery detector: circuit that produces a +5 V constant voltage to supply power to the electronic circuit of the unit, protecting it against power supply voltage variations. It also detects when the battery voltage is very near the minimum level required for a good functioning of the unit.

11.—MCU: circuit that receives, precesses and makes decisions based on the information received from the peripheric circuits (DTMF receiver, FDK decoder, memory, etc.) It handles all the logic of the unit functioning, as well as displays the information on the screen.

12.—Non-volatile memory: circuit that stores the information received from the telephone central by the MCU even without any power supply source at least during 50 years. The total storage capacity is 60 numbers in simple FSK form or DTMF, or 30 numbers in multiple FSK form.

13.—Keyboard: switches that serve as interface with the user in order to access or erase the information registered by the unit and it is also used to set, in the clock, the time and date determined by the user.

14—. LCD handler: circuit that generates the signals necessary for handling a LCD screen (Liquid Crystal Display) and displaying on it the information coming from the MCU.

15.—LCD: LCD screen used to display to the user the information registered by the unit.

16.—RF filter: circuit that reduces the interference in the telephone line provoked by radiofrequency signals, mainly AM signals (Amplitude Modulated).

17.—Telephone line: it is the access to the public telephone network through a pair of cables (A and B) connected to the telephone apparatus.

The telephone line consists of 2 cables, A and B (17) FIG. 3. Said cables are directly connected to the circuit of the apparatus (B) through a radiofrequency filter (16), which eliminates any interference induced and/or led in the telephone line.

The DTMF receiver (1) is normally in idle mode till the microcontroller (11) receives the polarity change signal detected by the circuit (4) or the microtelephone (A) lifted state is detected through the circuit (5). Once any of these two signals has be received, it activates the DTMF receiver (1) through the ACTIVATION line. Once activated, the receiver decodes the tones sent either by the telephone central or by the microtelephone itself (A). Each time a code is received with the valid frequency and duration, it sends the information to the microcontroller (11) through the VALID TONE line to be prepared to receive the information. Then the microcontroller enables the ENABLE OUTPUTS line and the receiver sends the corresponding number in binary system to the microcontroller (11) through the data lines.

The FSK demodulator (3) is normally in idle mode till the microcontroller (11) receives a call start current of a duration within a 200 ms to 400 ms range, detected by one of the parts of said FSK demodulator (3) through the CALL CURRENT line. If the call current duration is valid, the FSK demodulator (3) is activated through the ACTIVATION line, to begin to demodulates the information coming from the telephone line and send it serially through the data line to the microcontroller (11) to process and display it. In order to function, this demodulator requires a clock signal sent by an oscillator (2).

Once the information is received, said information is processed by the MCU (11) that stores it in the memory (12) using a serial protocol through the CLOCK AND DATA lines of said memory. The information is also displayed on the LCD screen (15) through the LCD handler (14), which generates the signals necessary to enable the Segment and Common lines of the LCD screen (15). The MCU (11) sends the information to the LCD handler (14) through the data and control lines. The screen can be activated of deactivated through the ACTIVATION line of the LCD handler.

For its functioning, the MCU needs the oscillator (7) which gives a constant clock signal. This oscillator (7) also sends the same signal to the DTMF receiver (1) so that it can decode correctly. The microcontroller (11) has also a real time clock based on a 32.768 KHz oscillator (6) for its updating.

The power for the whole circuit is supplied through a 9 V DC (8) or a battery eliminator (9), which pass through a regulation circuit (10) that gives a constant output of +5 V DC and protects the circuit against power supply voltage variations. It also has a low battery detector which informs the MCU (11) when the battery voltage is very near the minimum level required for the good functioning of the unit.

The way the user communicates with the device is through the keyboard which consists of three switches connected to the MCU and serve to go forward or backward through the list of calls or to erase one or several calls and adjust the clock.

According to drawings 1a. -5a,b, the parts that constitute the dual equipment for telephone calls identification are described hereinbelow.

Figure 1A:
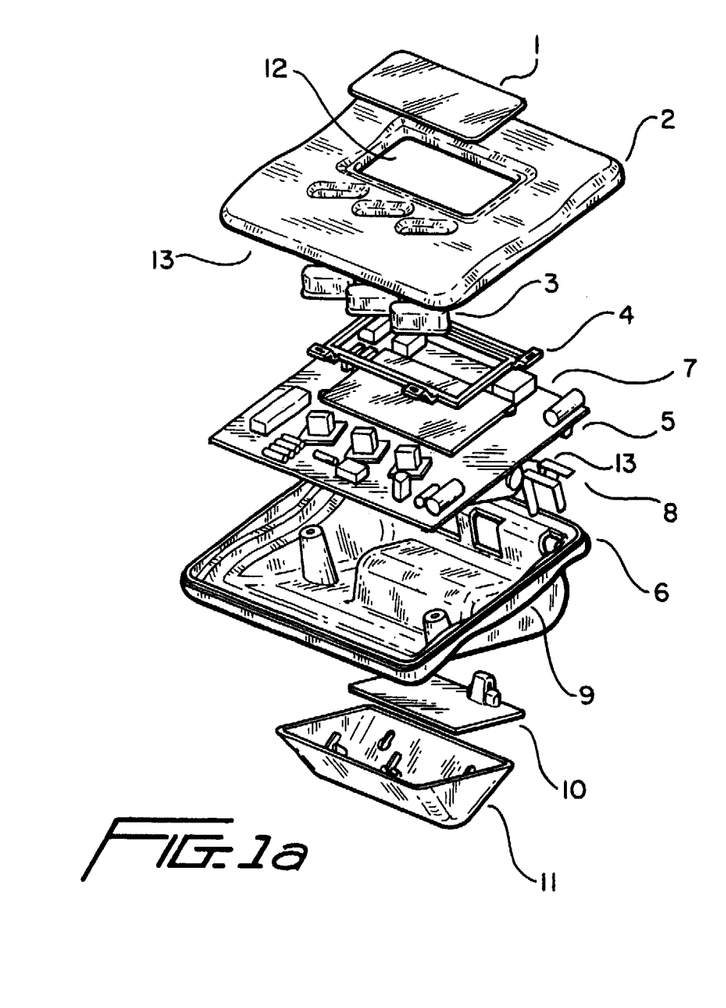
FIG. 1a. corresponds to an isometric view in vertical successive formation of the four sections that constitute the electronic dual equipment of call identification.
Figure 1B:
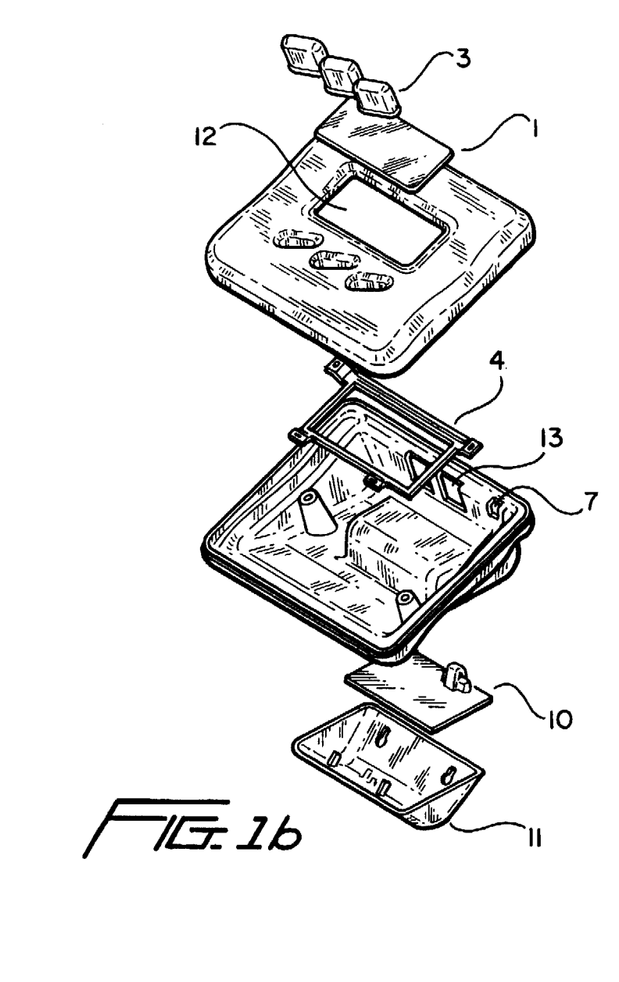
FIG. 1b. is an isometric view corresponding to FIG. 1a without board.

The dual equipment, FIG. 1, is physically integrated by two upper and lower main envelopes that are connected to an intermediate board of the electronic system with a screwed hermetic seal and a wall support. In the upper envelope, the outer area of a mica I is located, protecting the display (12) adhered to the cap 2 of the call identifier. In said upper envelope there is also a series of three buttons 3, aligned at one of the ends of said cap 2, it also includes zebra type connections, the board or card 5 of the printed circuit includes, besides its circuitry lines to zebra connectors 13, a jack 7, for battery eliminator, battery terminals 8; the board that corresponds to the base of the call identificator 6, and in said board there is a battery cavity with its corresponding battery cap 10, it also has antislide gums 14, a cavity for assembly screw 15 and it is, in turn, connected through a cavity 16, to place the wall support 11. In its backing end, the dual equipment includes also a cavity X for battery eliminator, a cavity Y and Z for connection, telephone and telephone rosette.

Functional description

The user identifier allows to see the telephone number before answering the telephone.

The identifier system can also keep in memory the telephone number of the last 30 calls even if the battery is withdrawn from the device.

The service that makes it possible to display the telephone number of the calls received is known as "Caller Identification".

The identifier has been designed to receive and display the digital information transmitted to the subscriber of this service from the telephone central, through the modulation of asynchronous FSK data at 1200 bauds or through the coding of the 16 pairs of standard frequencies of dual tone multifrequency DTMF.

The equipment has two parallel RJ11 female connectors. A connector goes to the line and the other connector to the telephone.

It also has polarity protection to connect the telephone line with direct polarity or with inverse polarity without affecting its functioning.

When the microtelephone is in a hung up state with regard to the terminal display equipment, it presents to the telephone line an impedance higher than 170K (at 1 KHz and 1 Vr).

Functional characteristics

The memory can keep information without any electric power supply. Besides, the memory can be erased by the user of the identificator. When the memory is saturated, its erases the number first registered and so successively.

It is understood that modifications and variations may be utilized without departing from the principles and scope of the invention. Accordingly, such modifications and variations may be practiced within the scope of the following claims.

We claim:

1. A caller identificator system that allows the called party to see at least the telephone number of the caller before answering the telephone for use in both FSK and DTMF telephone central caller-ID formats for receiving and decoding signals transmitted to telephone subscriber lines, said lines each having a first line and a second line, said system comprising:

a microcontroller unit/MCU for processing data and providing output signals, a non-volatile memory coupled to said microcontroller for storing data and programs; said MCU having a format selector to determine whether FSK format or DTMF format caller-ID format signals are about to be transmitted;

an FSK demodulator for demodulating said FSK format caller-ID signals transmitted through said first line and said second line, said format selector connecting said FSK demodulator and providing an FSK activation signal, said format selector determining FSK caller-ID format and providing said FSK activation signal includes a call start current detector and duration measurer and if both within predetermined values chooses FSK caller-ID format and provides said FSK activation signal to said FSK demodulator;

said microcontroller coupled to said FSK demodulator through a first FSK activation line upon which said FSK activation signal is transmitted;

a first data connection between said FSK demodulator and said microcontroller for providing data from said FSK demodulator into said microcontroller;

a DTMF receiver for decoding tones from either a microtelephone or said first and second lines, said microcontroller coupled to said DTMF receiver through a second activation line, said activation line providing a communication path for a DTMF activation signal, said format selector determining DTMF caller-ID format and providing said DTMF activation signal, include said selector including a polarity detection circuit coupled to said microcontroller for detecting a change in polarity and providing a polarity change signal to said microcontroller, said polarity change signal being a DTMF activation signal;

an off hook detector for determining the state of said microtelephone and providing an off hook signal to said microcontroller;

a second data connection is provided between said DTMF receiver and said microcontroller for providing data from said DTMF receiver into said microcontroller; and a keyboard for providing input to said microcontroller; said keyboard having at least one connector line to said microcontroller, an LCD display;

an LCD driver circuit; said display being interconnected to said driver circuit;

said LCD driver circuit being connected to said microcontroller;

and wherein said display shows caller-ID information of at least the telephone number of the caller to the caller party for telephone central offices which use either the FSK or DTMF caller-ID formats.

2. A call identificator according to claim 1, wherein said first and second lines are provided with an RF filter for reducing AM emission.

3. A call identificator according to claim 1, wherein said microcontroller is connected to a first oscillator and a second oscillator.

4. A call identificator according to claim 1, wherein said FSK demodulator is connected to a third oscillator.

5. A call identificator according to claim 1, wherein said microcontroller and said DTMF decoder are coupled with at least one DTMF control signal line.

6. A call identificator according to claim 1, wherein said microcontroller and said FSK demodulator are coupled with at least one FSK control signal line.

7. A call identificator according to claim 1, wherein said microcontroller is connected to a voltage regulator circuit for both battery and dc battery power.

8. A call identificator according to claim 7, wherein said voltage regulator is provided with a low battery detector.

9. A call identification according to claim 1, wherein said non-volatile memory stores information provided from said microprocessor.

10. A call identificator according to claim 9, wherein said non-volatile memory stores numbers from said FSK and DTMF caller-ID format receivers.

11. A call identificator according to claim 9, wherein said non-volatile memory provides storage without power for at least 50 years.

12. A caller identificator according to claim 1, wherein said DTMF receiver is normally in an idle mode until (a) said microcontroller receives said polarity change signal; or b) the lifted state of the microtelephone is detected;

whereupon the DTMF receiver is activated, said receiver, having an activation line as an input for said activation, decodes the tones sent by either the telephone central office or by the microtelephone itself; and each time, said receiver receives a tone with the valid frequency and duration, it informs the microcontroller through a valid tone line;

whereupon said microcontroller (a) intializes itself to receive caller-ID information; (b) enables the enable output line; and (c) sends the caller-ID information to the microcontroller.

13. A method of operating a dual caller ID format/FSK-DTMF caller-ID call identificator system controlled with a microcontroller for receiving and decoding signals transmitted through telephone lines, comprising:

processing data and providing output signals with a microcontroller, storing data and programs in a non-volatile memory from said microcontroller, detecting ring condition and providing a first signal on a call current line to said microcontroller, setting an FSK demodulator out of an idle mode when said first signal provides said microcontroller with a value indicating a valid ring through a first activation line, demodulating information provided on a first and second line with said FSK demodulator, communicate data from said FSK demodulator to said microcontroller through a first data connection;

storing said data from said FSK demodulator in said non-volatile memory through said microcontroller using clock and data lines;

detecting the polarity change in signal on said first and second lines, detecting an off hook condition on said first and second lines, sending second activation signal to a DTMF receiver to receive tones from either a microtelephone or said first and second lines based on conditions detected in said polarity change and off hook condition with said microcontroller, informing said microcontroller through a valid tone line when said DTMF receiver receives valid frequency and duration of tones, said microcontroller enabling said DTMF receiver through an enable line when valid frequency and duration of tones is detected;

sending DTMF format caller-ID data from said DTMF receiver into said microcontroller through a second data connection line to said microcontroller when said enable line is enabled;

storing said data from said DTMF receiver in said non-volatile memory through said microcontroller;

activating an LCD display interconnected to an LCD driver circuit through a third activation line connected between said microcontroller and said LCD driver, sending data representing information obtained from said first and second lines to said LCD from said microcontroller.

14. The method of operating a call identificator according to claim 13, further comprising filtering RF signals from said first and second lines.

15. The method of operating a call identificator according to claim 13, further comprising feeding a first oscillation and a second oscillation signal to two different areas of said microcontroller.

16. The method of operating a call identificator according to claim 13, further comprising setting the first oscillation signal at a frequency of 32.768 KHz to synchronize said microcontroller and said DTMF receiver.

17. The method of operating a call identificator according to claim 15, further comprising setting the second oscillation signal at a frequency of 3.58 MHz.

18. The method of operating a call identificator according to claim 13, further comprising feeding a third oscillation signal to said FSK demodulator.

19. The method of operating a call identificator according to claim 13, further comprising detecting said ring value range between 200 ms and 400 ms.

20. The method of operating a call identificator according to claim 13, further comprising storing numbers from said FSK and DTMF in said non-volatile memory.

21. The method of operating a call identificator according to claim 20, further comprising storing the memory without power for at least 50 years.

* * * * *